United States Patent
Pathak

(10) Patent No.: US 7,404,838 B1
(45) Date of Patent: Jul. 29, 2008

(54) SUPPORT FOR AN AIR FILTER

(76) Inventor: Pinakin Y. Pathak, 18823 S. Rochelle Ave., Cerritos, CA (US) 90703

( * ) Notice: Subject to any disclaimer, the term of this patent is extended or adjusted under 35 U.S.C. 154(b) by 286 days.

(21) Appl. No.: 11/177,706

(22) Filed: Jul. 8, 2005

Related U.S. Application Data

(60) Provisional application No. 60/586,592, filed on Jul. 9, 2004.

(51) Int. Cl.
- *B01D 39/00* (2006.01)
- *B01D 29/00* (2006.01)
- *B01D 35/30* (2006.01)

(52) U.S. Cl. .................... 55/490; 210/167; 210/232
(58) Field of Classification Search ............ 210/167, 210/82, 232, 497; 55/96, 490
See application file for complete search history.

(56) References Cited

U.S. PATENT DOCUMENTS

| | | | | |
|---|---|---|---|---|
| 2,460,084 A | * | 1/1949 | Hebo ................. 210/356 |
| 2,819,800 A | * | 1/1958 | Goodloe ............. 210/497.1 |
| 3,816,978 A | * | 6/1974 | O'Dell ................. 95/280 |
| 3,827,566 A | * | 8/1974 | Ponce ................. 210/338 |
| 4,153,552 A | * | 5/1979 | Muther ............... 210/769 |
| 4,244,718 A | * | 1/1981 | Noddin ............... 55/377 |
| 4,276,069 A | * | 6/1981 | Miller ................. 55/379 |
| 5,053,129 A | * | 10/1991 | Kitson ................. 210/232 |
| 6,099,729 A | * | 8/2000 | Cella et al. .......... 210/315 |

* cited by examiner

*Primary Examiner*—Walter D. Griffin
*Assistant Examiner*—Amber Miller Harris
(74) *Attorney, Agent, or Firm*—Ted Masters

(57) ABSTRACT

An internal support for an air filter includes a helical member which is shaped and dimensioned to fit against the inside surface of the air filter to provide structural support which prevents the air filter from inwardly collapsing. In another embodiment of the invention, a plurality of support rings are installed in spaced apart parallel relationship inside the air filter.

1 Claim, 6 Drawing Sheets

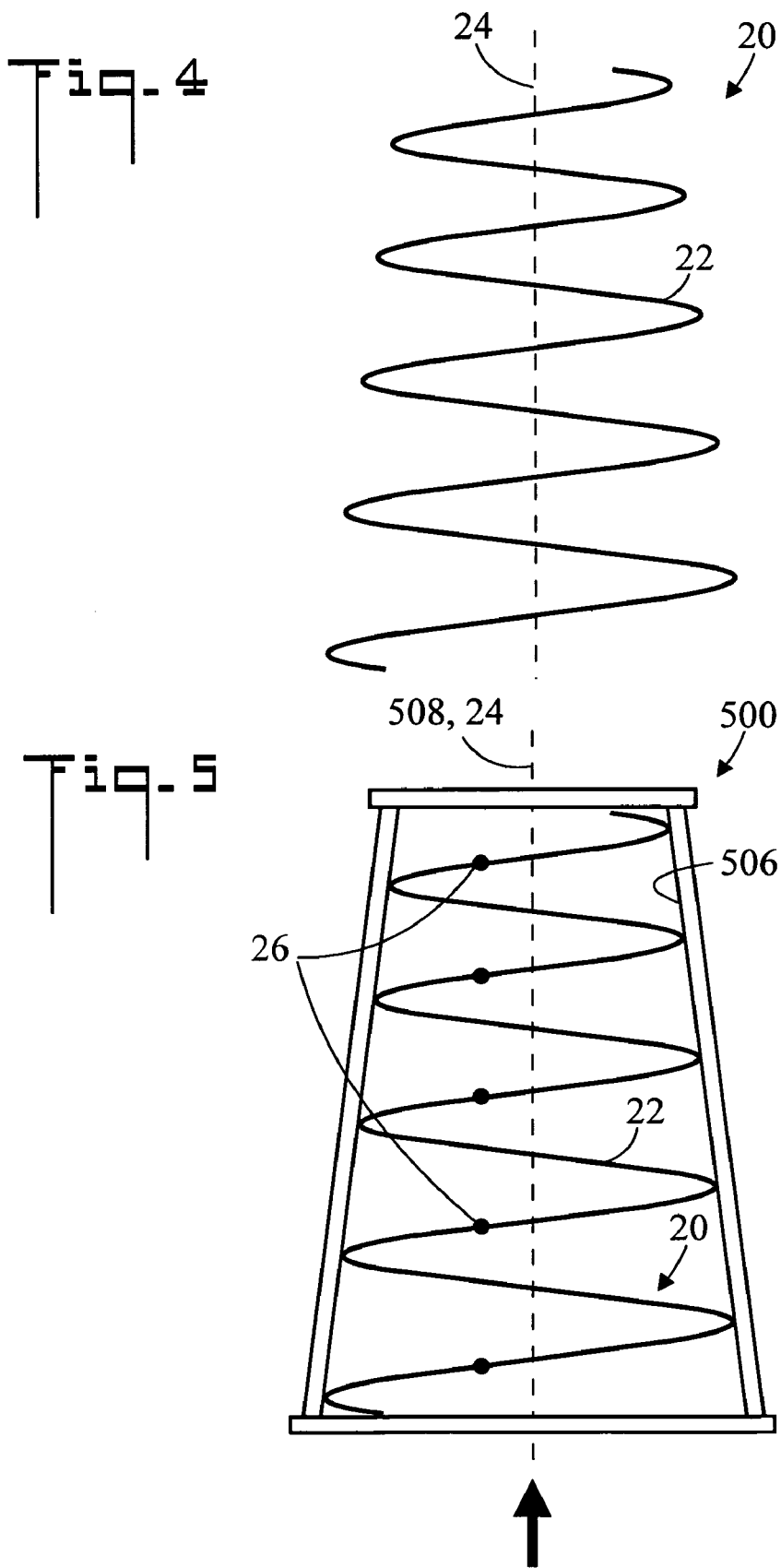

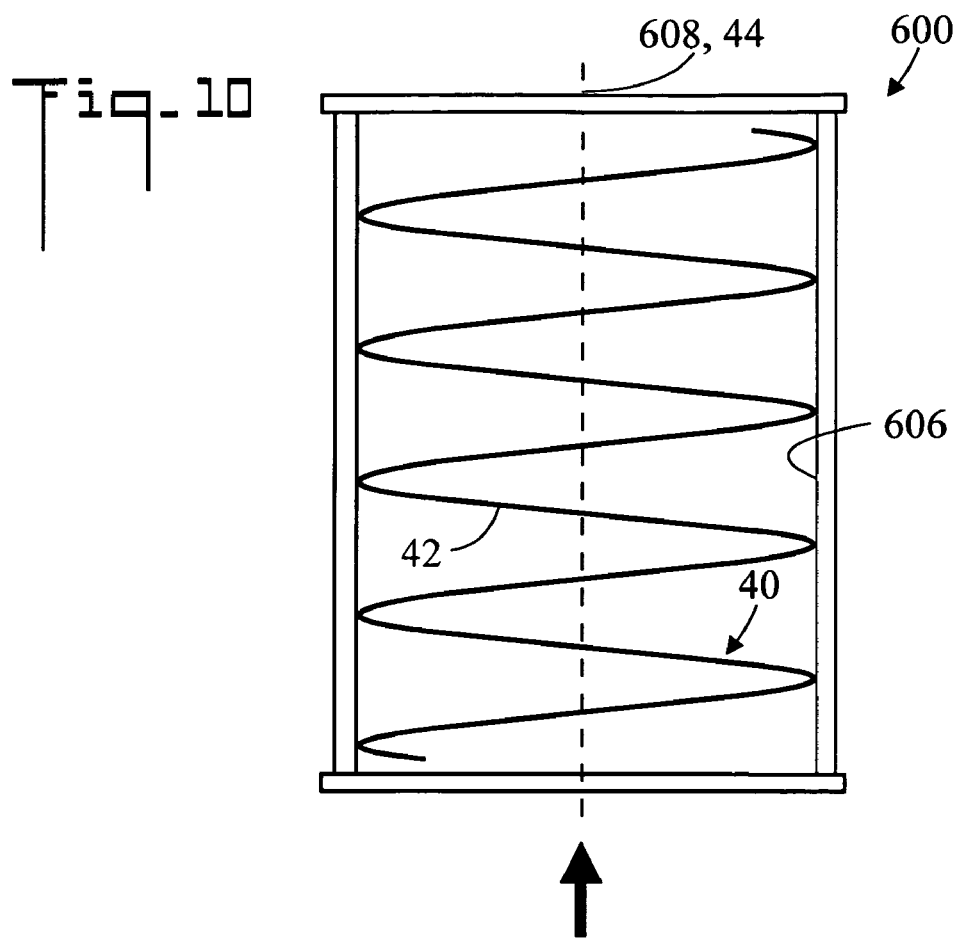
Fig-10
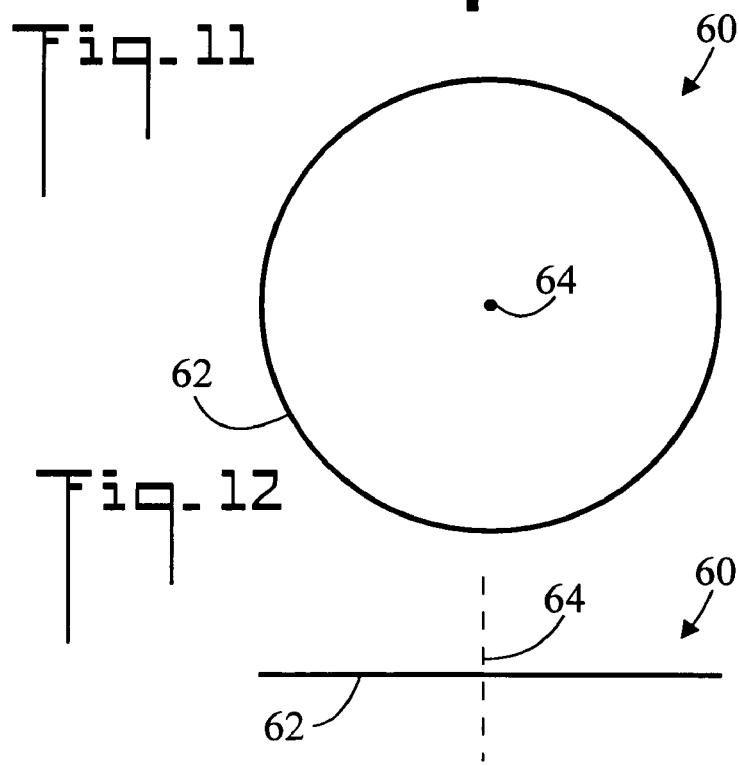
Fig-11
Fig-12

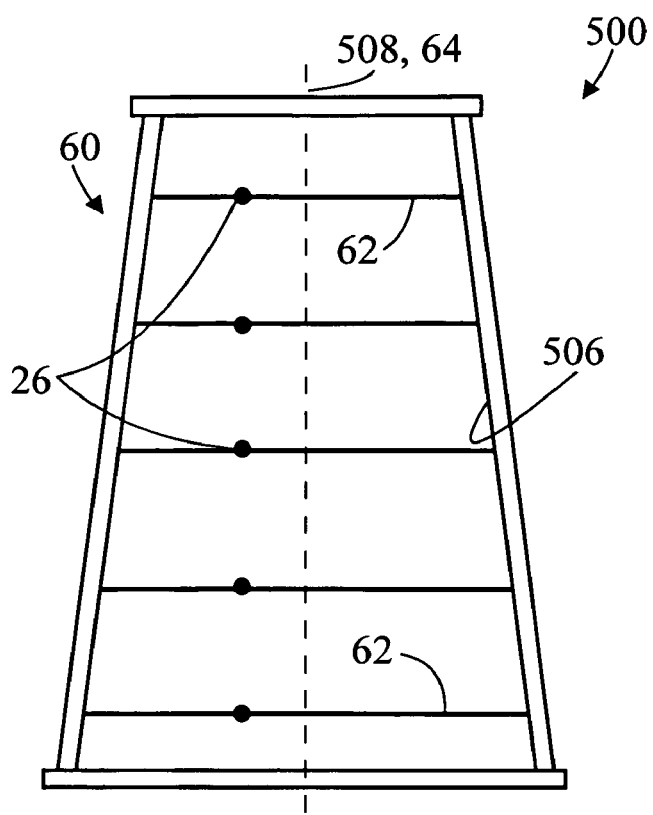
Fig_13
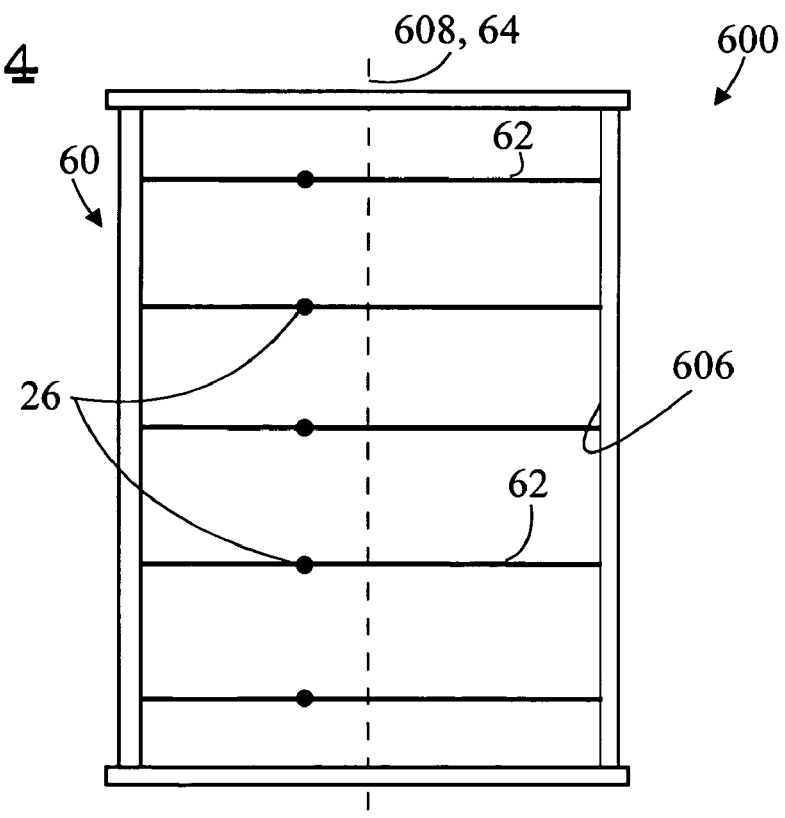
Fig_14

SUPPORT FOR AN AIR FILTER

CROSS REFERENCE TO RELATED APPLICATION

This application claims the filing benefit under 35 U.S.C. §119(e) of U.S. Provisional Application No. 60/586,592, filed Jul. 9, 2004, which is included herein by reference.

TECHNICAL FIELD

The present invention pertains generally to air filters, and more particularly to an inner support for cylindrical and conical air filters which prevents the air filters from collapsing.

BACKGROUND OF THE INVENTION

Air filters for heavy-duty transportation applications and also various internal combustion engines are designed to protect engines by forcing intake air to pass though a filtration process prior to entering the engine chamber. This is accomplished by forcing or sucking air through a pleated media air filter with a specific pass through efficiency prior to entering the engine chamber. This process allows for air intake into the engine chamber while preventing particulates from entering the engine. Air filtration efficiency is measured in terms of air flow, dust holding capacity, restriction, and final efficiency which is typically measured by amount of duct fed verses amount of duct blocked by the filter.

Existing air filtration products for transportation applications come in various shapes, sizes, number of pleats and specific efficiencies. The most prevalent air filter shapes for transportation applications are frustoconical and cylindrical. Cylindrical and frustoconical filters consist of pleated layers of filter media (usually cotton), wire mesh, and an inner support layer made up expanded metal bound together in polymer composite on either ends or with metal end caps. The inner support layer is required to prevent inward collapse of the filter unit during both storage and use. Currently in the vast majority of cylindrical and frustoconical air filters the inner support layer is made up of expanded metal, which greatly increases air resistance. The existing expanded metal inner support solution presents greater surface area for air to have to pass though. This prevents maximum air intake, which is a factor in greater engine performance, while proving no considerable advantage for filter efficiency.

BRIEF SUMMARY OF THE INVENTION

The present invention is directed to an alternative solution to prevent filter collapse. The present invention replaces the existing expanded metal inner support layer with a streamlined method of inner support. In the present invention a helical (spiral shaped) inner support is installed on the inside of the filter media. The support provides radial support and prevents the filter from inwardly collapsing from the inward flow of air. The present invention provides a sizeable advantage for air filtration applications, provides the required structural support to prevent collapse, and presents minimal surface area thereby allowing maximum engine air intake. The result is higher engine performance with consistent engine protection and superior structural support. In another embodiment of the invention, a plurality of spaced apart support rings are installed on the inside of the filter media.

In accordance with a preferred embodiment of the invention, a support for an air filter includes a helical member which is shaped and dimensioned to fit against the inside surface of the air filter to provide structural support and prevent the air filter from inwardly collapsing.

In accordance with an aspect of the invention, the helical member is fabricated from spring steel or some other resilient material.

In accordance with another aspect of the invention, the helical member is fixedly attached to the inside surface of the air filter with a bonding agent.

In accordance with another aspect of the invention, the helical member has one of (1) a tapered shape, and (2) a cylindrical shape.

In accordance with another embodiment of the invention, the support comprises a plurality of ring members which are shaped and dimensioned to fit against the inside surface of the air filter in spaced apart relationship to prevent the air filter from inwardly collapsing.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 4 is a side elevation view of a support for an air filter in accordance with the present invention;

FIG. 5 is a breakaway side elevation view of the support of FIG. 4 inserted inside the prior art frustoconical air filter;

FIG. 10 is a breakaway side elevation view of the support of FIG. 9 inserted inside the prior art cylindrical air filter;

FIG. 11 is a top plan view of a second embodiment support for and air filter;

FIG. 12 is a side elevation view of the second embodiment support;

FIG. 13 is a breakaway side elevation view of the second embodiment support inserted inside the prior art frustoconical air filter; and, FIG. 14 is a breakaway side elevation view of the second embodiment support inserted inside the prior art cylindrical air filter.

DETAILED DESCRIPTION OF THE INVENTION

Figures 1, 2, 3:
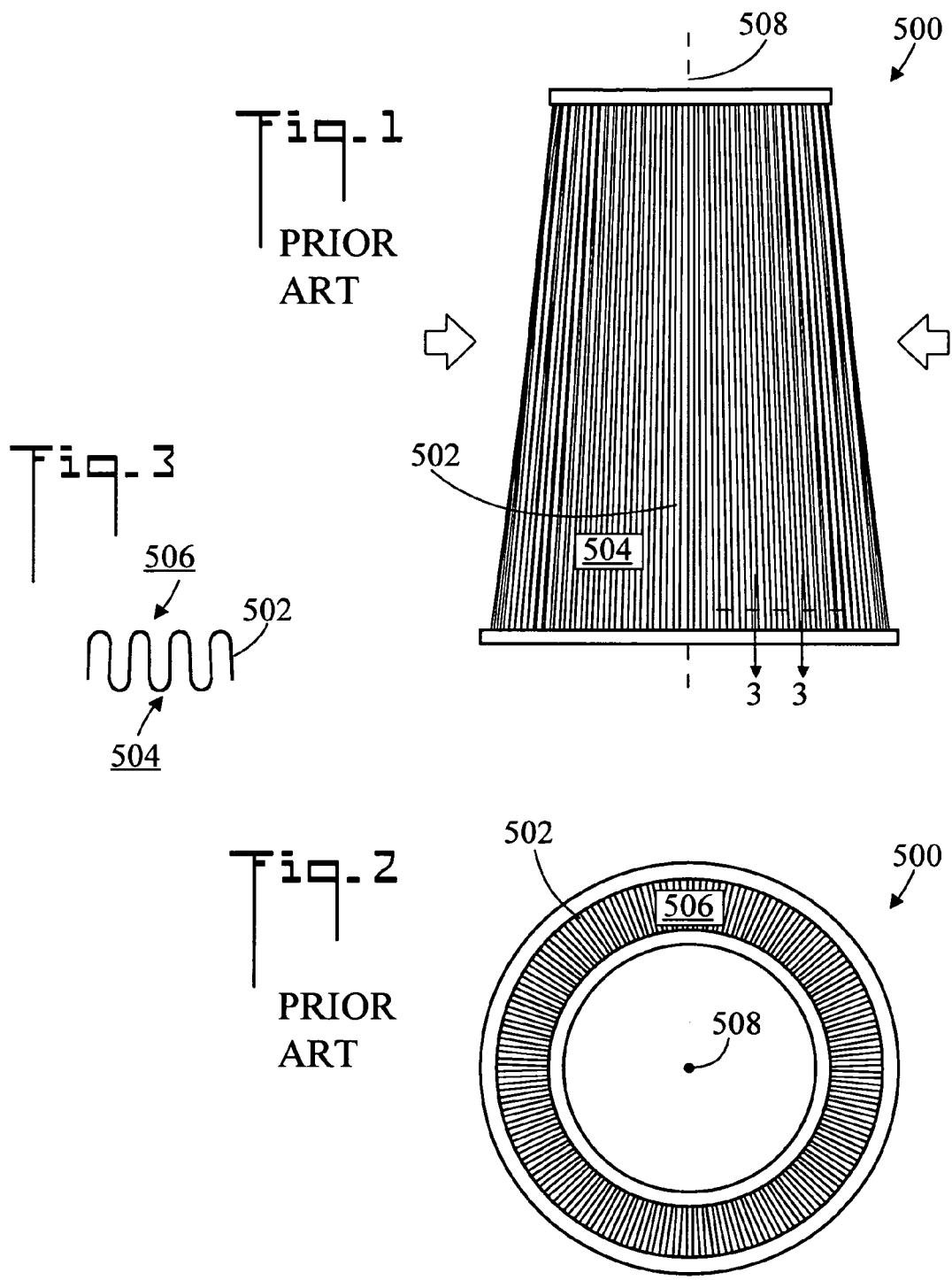
FIG. 1 is a side elevation view of a prior art frustoconical air filter.
FIG. 2 is an end view of the prior art frustoconical air filter.
FIG. 3 is an enlarged cross sectional view along line 3-3 of FIG. 1.

Referring initially to FIGS. 1 and 2, there are illustrated side elevation and end views respectively of a prior art frustoconical air filter, generally designated as 500. Frustoconical air filter 500 is a frustum of a cone and includes a body comprised of a plurality of air filter pleats 502 which are arranged in circular relationship. The plurality of pleats 502 define an outside surface 504 and an opposite inside surface 506. In use, air travels through air filter 500 from the outside surface 504 to the inside surface 506. Frustoconical air filter 500 has a central axis 508.

FIG. 3 is an enlarged cross sectional view along line 3-3 of FIG. 1 showing pleats 502, outside surface 504 and inside surface 506.

Now referring to FIG. 4, there is illustrated a side elevation view of a support for an air filter in accordance with the present invention, generally designated as 20. Support 20 includes a helical member 22 which is shaped and dimensioned to fit closely against inside surface 506 of cylindrical air filter 500 providing support thereto and thereby preventing cylindrical air filter 500 from inwardly collapsing. In the shown embodiment helical member 22 has a tapered shape to conform to the tapered inside surface 506 of frustoconical air filter 500. Helical member 22 has a central axis 24, and is fabricated from spring steel or any other material with sufficient strength to keep filter 500 from inwardly collapsing.

Figure 6:
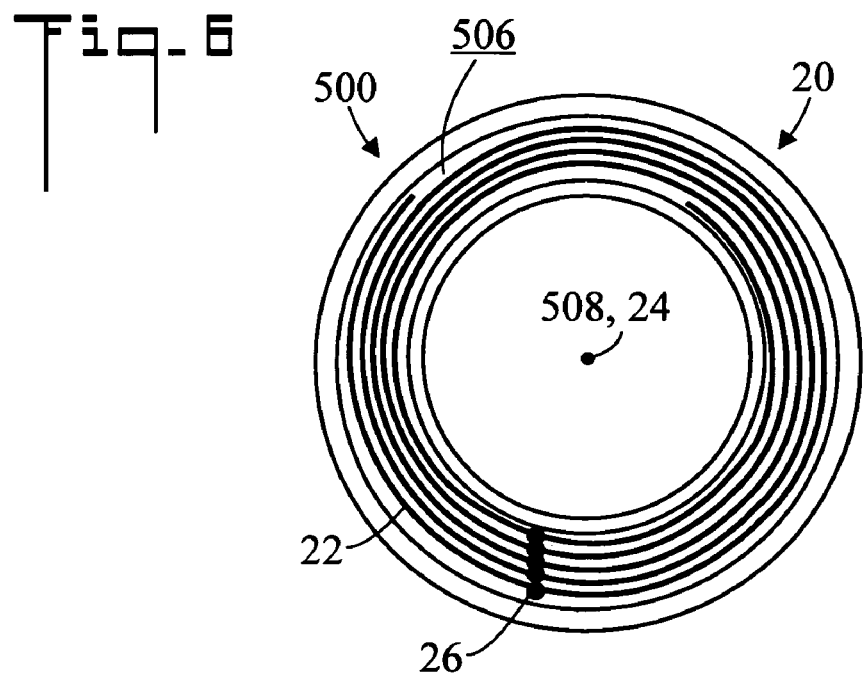
FIG. 6 is an end view of the support inserted inside the prior art frustoconical air filter.

FIG. 5 is a breakaway side elevation view of support 20 inserted inside prior art frustoconical air filter 500, and FIG. 6 is an end view of support 20 inserted inside prior art frustoconical air filter 500. It is noted that in FIGS. 5 and 6, pleats 502 have been omitted for clarity. Support 20 is inserted into frustoconical air filter 500 such that central axes 508 and 24 are co-linear, and so that support 20 closely fits against inside surface 506 of frustoconical air filter 500. In the shown embodiment helical member 22 is fixedly attached to inside surface 506 of frustoconical air filter 500. The attachment is effected by a bonding agent 26 (such as an epoxy, a polymer, an adhesive or the like) which fixedly attaches helical member 20 to inside surface 506 of the frustoconical air filter 500. In the shown embodiment, helical member 22 has a length, and bonding agent 26 is placed at periodic intervals along the length of helical member 22.

Figure 7:
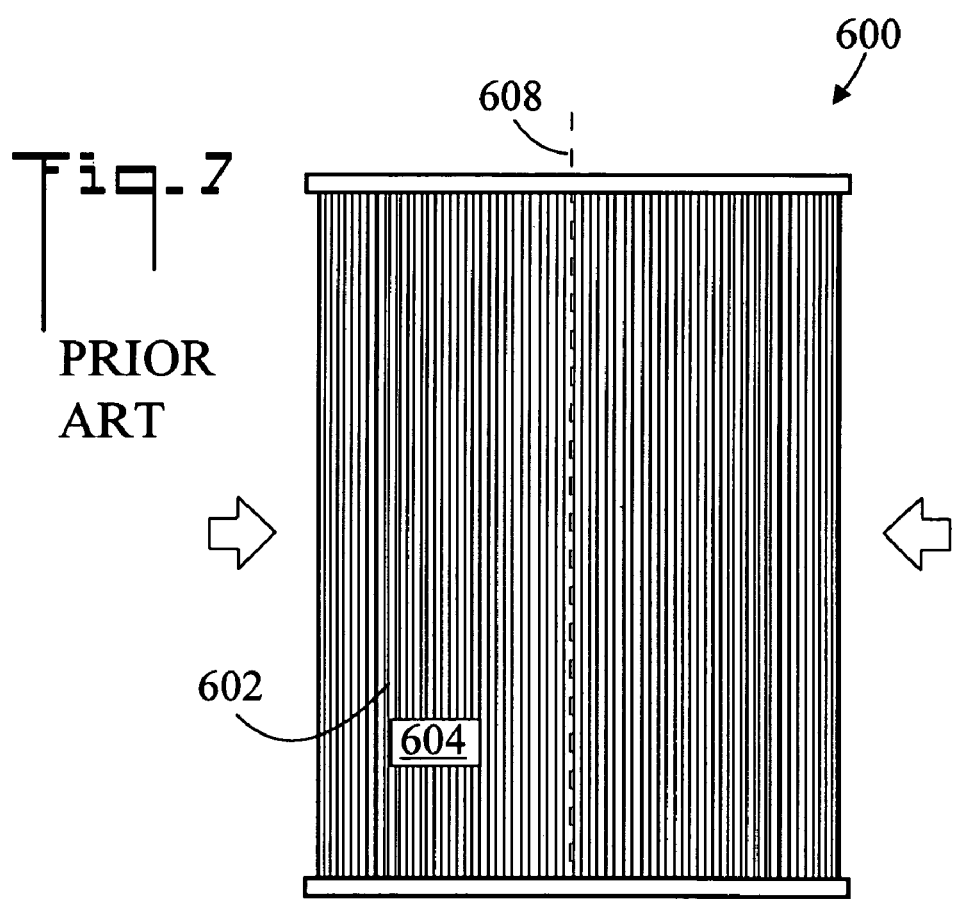
FIG. 7 is a side elevation view of a prior art cylindrical air filter.
Figure 8:
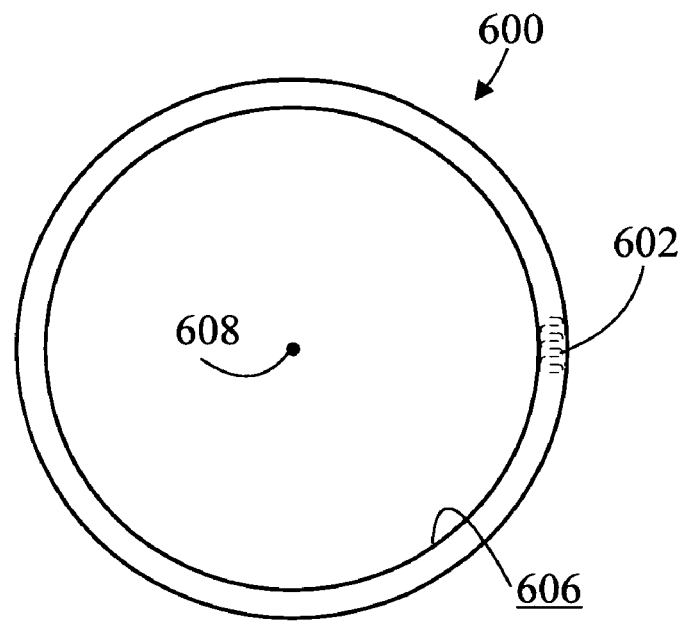
FIG. 8 is an end view of the prior art cylindrical air filter.

Now referring to FIGS. 7 and 8, there are illustrated side elevation and end views respectively of a prior art cylindrical air filter, generally designated as 600. As with frustoconical air filter 500, cylindrical air filter 600 includes a body comprised of a plurality of air filter pleats 602 which are arranged in circular relationship. The plurality of pleats 602 define an outside surface 604 and an opposite inside surface 606. In use, air travels through air filter 600 from the outside surface 604 to the inside surface 606. Cylindrical air filter 600 has a central axis 608.

Figure 9:
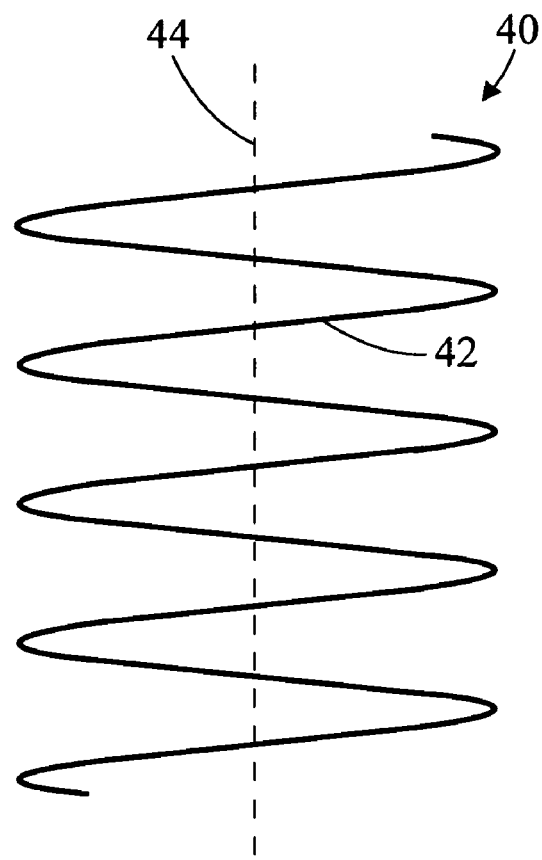
FIG. 9 is a side elevation view of a second support for an air filter in accordance with the present invention.

Now referring to FIG. 9, there is illustrated a side elevation view of a second support for an air filter in accordance with the present invention, generally designated as 40. Support 40 includes a helical member 42 which is shaped and dimensioned to fit closely against inside surface 606 of cylindrical air filter 600 providing support thereto and thereby preventing cylindrical air filter 600 from inwardly collapsing. In the shown embodiment helical member 42 has a cylindrical shape to conform to the inside surface 606 of cylindrical air filter 600. Helical member 42 has a central axis 44, and is fabricated from spring steel or some other resilient material.

FIG. 10 is a breakaway side elevation view of support 40 inserted inside prior art cylindrical air filter 600. It is noted that pleats 602 have been omitted for clarity. Support 40 is inserted into cylindrical air filter 600 such that central axes 608 and 44 are co-linear, and so that support 40 closely fits against inside surface 606 of cylindrical air filter 600. In the shown embodiment helical member 42 is not fixedly attached to inside surface 606 of cylindrical air filter 600, but rather is simply placed inside cylindrical air filter 600.

Now referring to FIGS. 11 and 12, there are illustrated top plan and side elevation view respectively of a second embodiment support for an air filter, generally designated as 60. Support 60 comprises a plurality of ring members 62 which are shaped and dimensioned to fit against the inside surface of the air filter in spaced apart parallel relationship, thereby preventing the air filter from inwardly collapsing. Ring members 62 have a central axis 64. As with supports 20 and 40, support 60 is fabricated from spring steel or some other suitable material.

FIG. 13 is a breakaway side elevation view of support 60 inserted inside prior art frustoconical air filter 500. It is noted that pleats 502 have been omitted for clarity (refer to FIG. 1). A plurality of ring members 62 are fixedly attached to inside surface 506 of the air filter 500. The plurality of ring members 62 reside in parallel spaced apart relationship along axes 508 and 64. Supports 60 are inserted into frustoconical air filter 500 such that central axes 508 and 64 are co-linear, and so that supports 60 closely fits against inside surface 506 of frustoconical air filter 500. In the shown embodiment ring members 62 are fixedly attached to inside surface 506 of frustoconical air filter 500. The attachment is effected by a bonding agent 26 (such as an epoxy, a polymer, an adhesive or the like) which fixedly attaches ring members 62 to inside surface 506 of the frustoconical air filter 500. It may be appreciated that for use with a frustoconical air filter, each ring member 62 must have a different diameter.

FIG. 14 is a breakaway side elevation view of the second embodiment support 60 inserted inside prior art cylindrical air filter 600. It is noted that pleats 502 are deleted for clarity (refer to FIG. 1). A plurality of ring members 62 are fixedly attached to inside surface 606 of the air filter 600. The plurality of ring members 62 reside in parallel spaced apart relationship along axes 608 and 64. Supports 60 are inserted into cylindrical air filter 600 such that central axes 608 and 64 are co-linear, and so that supports 60 closely fits against inside surface 606 of cylindrical air filter 600. In the shown embodiment ring members 62 are fixedly attached to inside surface 606 of cylindrical air filter 600. The attachment is effected by a bonding agent 26 (such as an epoxy, a polymer, an adhesive or the like) which fixedly attaches ring members 62 to inside surface 606 of the cylindrical air filter 500. It may be appreciated that for use with a cylindrical air filter, each ring member 62 must have the same diameter.

The preferred embodiments of the invention described herein are exemplary and numerous modifications, variations, and rearrangements can be readily envisioned to achieve an equivalent result, all of which are intended to be embraced within the scope of the appended claims.

I claim:

1. A support for an air filter, the air filter having an outside surface and an opposite inside surface, said support comprising:
    a helical member which is shaped and dimensioned to fit against the inside surface of the air filter to prevent the air filter from inwardly collapsing;
    said helical member fixedly attached to the inside surface of the air filter;
    a bonding agent fixedly attaching said helical member to the inside surface of the air filter;
    said helical member having a length;
    said bonding agent placed at periodic intervals along said length of said helical member;
    said helical member fabricated from spring steel;
    when the air filter is viewed from the top, said periodic intervals being about every 360°;
    when the air filter is viewed from the side, said bonding agent placements being collinear;
    said bonding agent being epoxy; and,
    said helical member having one of (1) a tapered shape, and (2) a cylindrical shape.

* * * * *